US012722757B1

(12) United States Patent
George et al.

(10) Patent No.: US 12,722,757 B1
(45) Date of Patent: Sep. 1, 2026

(54) WAKESURF MONITORING SYSTEM AND METHOD

(71) Applicant: Brunswick Corporation, Mettawa, IL (US)

(72) Inventors: Trevor George, Savoy, IL (US); Rakshith Sudhir Singh, Peoria, IL (US)

(73) Assignee: Brunswick Corporation, Mettawa, IL (US)

( * ) Notice: Subject to any disclaimer, the term of this patent is extended or adjusted under 35 U.S.C. 154(b) by 306 days.

(21) Appl. No.: 18/355,120

(22) Filed: Jul. 19, 2023

Related U.S. Application Data

(60) Provisional application No. 63/391,425, filed on Jul. 22, 2022.

(51) Int. Cl.

| | |
|---|---|
| ***B63B 79/15*** | (2020.01) |
| ***B63B 39/03*** | (2006.01) |
| ***B63B 49/00*** | (2006.01) |
| ***B63B 79/40*** | (2020.01) |
| ***B63H 21/21*** | (2006.01) |
| ***G06T 7/593*** | (2017.01) |
| ***G06T 7/60*** | (2017.01) |
| ***G06T 7/73*** | (2017.01) |

(52) U.S. Cl.
CPC .............. *B63B 79/15* (2020.01); *B63B 39/03* (2013.01); *B63B 49/00* (2013.01); *B63B 79/40* (2020.01); *B63H 21/21* (2013.01); *G06T 7/593* (2017.01); *G06T 7/60* (2013.01); *G06T 7/73* (2017.01); *B63H 2021/216* (2013.01); *G06T 2207/10012* (2013.01)

(58) Field of Classification Search
CPC ......... B63B 79/15; B63B 39/03; B63B 49/00; B63B 79/40; B63H 21/21; B63H 2021/216; G06T 7/593; G06T 7/60; G06T 7/73; G06T 2207/10012
See application file for complete search history.

(56) References Cited

U.S. PATENT DOCUMENTS

| | | | |
|---|---|---|---|
| 9,540,074 B1 | 1/2017 | Pigeon | |
| 9,796,451 B2 | 10/2017 | Brendel | |
| 9,937,984 B2 | 4/2018 | Herrington et al. | |
| 10,372,976 B2 | 8/2019 | Kollmann et al. | |
| 10,479,461 B1 | 11/2019 | Hartman et al. | |
| 10,683,061 B2 | 6/2020 | Gasper et al. | |
| 10,858,080 B1 | 12/2020 | Hartman et al. | |
| 11,067,979 B2 | 7/2021 | Green et al. | |
| 11,260,946 B1 | 3/2022 | Przybyl et al. | |
| 2017/0247895 A1* | 8/2017 | Webber .............. | A63B 69/0093 |

FOREIGN PATENT DOCUMENTS

| | | |
|---|---|---|
| KR | 102678661 B1 | 6/2024 |

* cited by examiner

*Primary Examiner* — Yuen Wong
(74) *Attorney, Agent, or Firm* — Andrus Intellectual Property Law, LLP

(57) ABSTRACT

A method of monitoring wakesurf includes imaging with an image system an area behind a marine vessel to generate image data containing at least one image of the area behind the marine vessel, identifying at least one dimension of a wake wave and/or a location of a wakesurf rider in the image data, and generating a wave pocket alteration action based on the at least one dimension of the wake wave and/or the location of the wakesurf rider.

24 Claims, 11 Drawing Sheets

WAKESURF MONITORING SYSTEM AND METHOD

CROSS-REFERENCE TO RELATED APPLICATION

This application claims benefit of U.S. Provisional Patent Application No. 63/391,425, filed Jul. 22, 2022, the content of which is incorporated herein by reference in its entirety.

FIELD

The present disclosure generally relates to systems and methods of wakesurf monitoring, including monitoring and/or controlling a wake wave for wakesurfing.

BACKGROUND

The following U.S. patents provide background information and are incorporated herein by reference, each in its entirety:

U.S. Pat. No. 9,937,984 discloses a wake control system aft of the driveshaft, propeller, and rudder of a vessel that includes a fin base and at least one fin slidingly engaged with the fin base. The fin(s) are vertically oriented and extend down into the water surface. The fins are transversely adjustable along the fin base to redirect a wake generated by the boat. In other embodiments, the control system comprises a starboard fin tab adjacent to a port fin tab, each of the independent fin tabs hingeably attached to the aft section of the hull, at the transom. Each fin tab includes at least one extending fin. Fin tabs are selectively deployable and retractable into and out of the water surface to redirect a wake generated by the vessel from one side to the other. A novel underwater exhaust system redirects exhaust depending on speed of the vessel and complements the wake control system.

U.S. Pat. No. 10,372,976 discloses an object detection system for a marine vessel having at least one marine drive that includes at least one image sensor positioned on the marine vessel and configured to capture an image of a marine environment on or around the marine vessel. The object detection system further includes an image scanning module executable on the processor that receives the image as input. The image scanning module includes an artificial neural network trained to detect patterns within the image of the marine environment associated with one or more predefined objects, and to output detection information regarding a presence or absence of the one or more predefined objects within the image of the marine environment.

U.S. Pat. No. 11,260,946 discloses a method of automatically controlling trim position of a marine drive with a control system on a marine vessel that includes receiving a user-selected command associated with wake surfing and then controlling a trim actuator to automatically position the marine drive in a tucked position, tucked position is between a vertical trim position and a minimum running trim position. Once a vessel condition of the marine vessel reaches a first threshold vessel condition the trim actuator is controlled to trim up the marine drive to a predetermined target trim position to generate wave behind the marine vessel. The first threshold vessel condition is at least one of a threshold vessel speed, a threshold engine speed, a threshold engine load, and a threshold vessel pitch.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the disclosure, a wakesurf monitoring system includes an image system configured to image an area behind a marine vessel and a control system. The control system is configured to receive image data containing at least one image of the area behind the marine vessel from the image system, identify a wake wave in the image data, determine at least one dimension of the wake wave, compare the at least one dimension of the wake wave to a target wake wave geometry range, and generate a wave pocket alteration action based on the comparison.

In one embodiment, generating the wave pocket alteration action includes controlling a marine drive to increase or decrease a speed of the marine vessel and/or controlling a trimmable device or a fillable ballast to increase or decrease a pitch of the marine vessel.

In another embodiment, generating the wave pocket alteration action includes controlling a user interface to generate a wave pocket alert instructing operation of a marine drive, a trimmable device, and/or a fillable ballast to adjust at least one of a speed or a pitch of the marine vessel.

In another embodiment, the control system is further configured to determine that the at least one dimension of the wake wave is outside of the target wake wave geometry range and generate the wave pocket alteration action based on a difference between the dimension of the wake wave and the target wake wave geometry range.

In another embodiment, the at least one dimension of the wake wave includes a wave height, and wherein the target wake wave geometry range includes a maximum height limit and a minimum height limit.

In another embodiment, the at least one dimension of the wake wave includes a wave pocket length, wherein the target wake wave geometry range includes a maximum length limit and a minimum length limit.

In another embodiment, the at least one dimension of the wake wave includes a distance of at least one wave feature from the marine vessel, and wherein the target wake wave geometry range includes a maximum distance limit and a minimum distance limit.

In another embodiment, the at least one dimension of the wake wave includes a slope of the wave and/or an angle of the wave with respect to an axis of the marine vessel.

In another embodiment, the at least one dimension of the wake wave includes an aeration indicator, wherein when the aeration indicator is outside of a threshold the wave alteration action is generated to decrease the aeration level of the water within a wave pocket for wake surfing. Optionally, the aeration indicator includes color and/or clarity of the water on at least a portion of the wake wave.

In another embodiment, the control system is further configured to identify a location of a wakesurf rider in the image data and generate the wave pocket alteration action based further on the location of the wakesurf rider.

In another embodiment, the control system is further configured to compare the location of the wakesurf rider to an optimal surf location range and generate the wave pocket alteration action based further on the comparison. In one embodiment, the optimal surf location range includes a range of displacements between a predefined feature of the wake wave and the wakesurf rider.

In another embodiment, the control system is further configured to determine a distance of the wakesurf rider with respect to the marine vessel, and the optimal surf location range includes a range of distances between the marine vessel and the wakesurf rider.

In one aspect of the disclosure, a method of monitoring wakesurf includes imaging with an image system an area behind a marine vessel, receiving image data from the image system, the image data containing at least one image of the area behind the marine vessel, identifying at least one dimension of a wake wave and/or a location of a wakesurf rider in the image data, and generating a wave pocket alteration action based on the at least one dimension of the wake wave and/or the location of the wakesurf rider.

In one embodiment, the at least one dimension of the wake wave includes a wave height, a wave pocket length, and/or a distance of at least one wave feature from the marine vessel and the target wake wave geometry range includes at least one of a maximum height limit and a minimum height limit, a maximum length limit and a minimum length limit, and a maximum distance limit and a minimum distance limit.

In another embodiment, the location of the wakesurf rider includes a relative location compared to a wave feature and/or a distance of the wakesurf rider with respect to the marine vessel, wherein the optimal surf location range includes a minimum relative location and a maximum relative location and/or a minimum distance and a maximum distance.

In another embodiment, generating the wave pocket alteration action includes controlling a marine drive to increase or decrease a speed of the marine vessel and/or controlling a trimmable device or a fillable ballast to increase or decrease a pitch of the marine vessel.

In another embodiment, generating the wave pocket alteration action includes controlling a user interface to generate a wave pocket alert instructing operation of a marine drive, a trimmable device, and/or a fillable ballast to adjust at least one of a speed or a pitch of the marine vessel.

In another aspect of the disclosure, a wakesurf monitoring system includes image system configured to image an area behind a marine vessel and a control system. The control system is configured to receive image data from the image system containing at least one image of the area the area behind the marine vessel, identify a rider location of at least one wakesurf rider in the image data, determine that the rider location is outside of an optimal surf location range on a wake wave, and then generate a wave alteration action.

In another embodiment, the wave alteration action includes controlling at least one marine drive, a trimmable device, and/or at least one wave generation accessory on the marine vessel to adjust a location of a wave pocket based on the rider location. For example, the wave generation accessory includes at least one of a ballast and a wave-shaping plate.

In another embodiment, the wave alteration action includes generating a wave pocket alert on a user interface.

In another embodiment, the wave pocket alert instructs a user to control at least one of a marine drive or a wave generation accessory on the marine vessel to adjust a location of a wave pocket.

In another embodiment, the wave alteration action includes controlling a trim position of the marine drive with respect to the marine vessel to increase or decrease a pitch of the marine vessel.

In another embodiment, the control system is further configured to determine the rider location with respect to the marine vessel and the optimal surf location range includes a range of longitudinal distances between the marine vessel and the wakesurf rider.

In another embodiment, the control system is further configured to determine the rider location with respect to a predefined feature of the wake wave, wherein the optimal surf location range is determined based on the predefined feature of the wake wave.

In another aspect of the disclosure, a method of controlling a wake wave behind a marine vessel includes imaging with an image system an area behind a marine vessel to generate image data, identifying a rider location of at least one wakesurf rider in the image data, determining that the rider location is outside of an optimal surf location range on a wake wave, and then generating a wave alteration action.

In another embodiment, generating the wave alteration action includes controlling a marine drive to increase or decrease a speed of the marine vessel, controlling at least one wave generation accessory, and/or generating an alert to a user.

BRIEF DESCRIPTION OF THE DRAWINGS

The present disclosure includes the following Figures.

DETAILED DESCRIPTION

Figure 1:
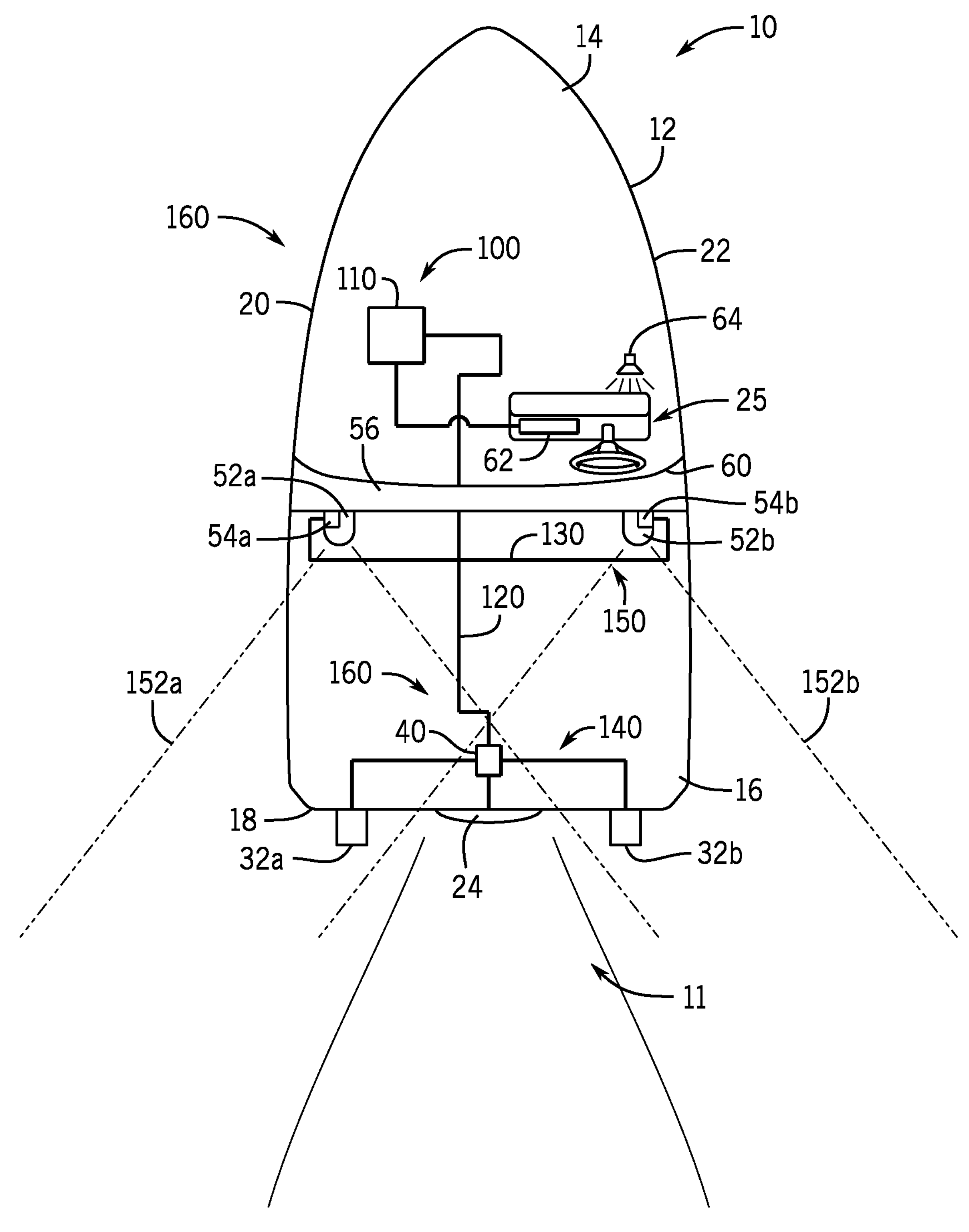
FIG. 1 is a schematic view of a marine vessel having an exemplary wakesurf monitoring system according to one embodiment of the present disclosure.

The present disclosure relates to marine vessels equipped for wakesurfing and having control systems and devices for modifying a wake of a marine vessel, such as to improve the surfing experience for a rider behind the marine vessel. The inventors have recognized that wake surfing is a difficult activity to learn and perfect, and that the surfing experience is negatively impacted when the rider is unable to stay on the wake. The wake wave behind the vessel includes a wave pocket, which is a section of the wave where the rider experiences the most forward acceleration force and has the best surface area for surfing. When a wakesurf rider gets too far outside the pocket, there is an insufficient wave-generated force to push them forward and they will eventually fall off the wave and will not be able to continue.

Given those challenges, the inventors developed the disclosed system to provide driver assistance and/or automated control functionality to help maintain a wakesurf rider in an optimal surf location on the wave, such as in the wave pocket. As disclosed herein, a wakesurf monitoring system is configured to image an area behind the vessel, identify a rider location of at least one wakesurf rider in the image data, and generate a wave alteration action when the rider location is outside of an optimal surf location range, such as outside of a wave pocket or outside of a range of displacements from one or more wave features. The wakesurf monitoring system may include an image system configured to image an area behind the vessel and a control system configured to generate the wave alteration action when the surfer is outside of the wave pocket or is otherwise outside of an optimal surf location range.

In some embodiments, a wave alteration action includes controlling a propulsion system of the marine vessel to increase or decrease the speed of the marine vessel to change the size and/or shape of the wake wave as well as the location of the wave pocket. Alternatively or additionally, the wave alteration action includes controlling steering position of a steerable marine drive and/or rudder in order to adjust a heading of the marine vessel, which may be a temporary adjustment. Alternatively or additionally, a wave alteration action includes controlling at least one of a group of wave generation accessories, such as one or tabs, plates, wedges, or other elements mounted to the lower portion of the transom or on the rear side of the vessel, a ballast, or other device to increase or decrease a pitch of the marine vessel and control the size and shape of the wake wave. Many different types of wave-shaping accessories are known in the art. For instance, the wave generation accessories may include one or more wave-shaping plates, such as trim tab(s), wakeplate(s), surf gate(s), or other element(s) controllable to change the wave shape, size, and/or location behind the vessel. Alternatively or additionally, the wave generation accessories may include one or more ballasts, where a fill level of the ballast is controllable. For example, a vessel may be equipped with a rear ballast at the back of the vessel toward the stern, and also may have one or more of a center ballast and a bow ballast. In some examples, a vessel may have two rear ballasts or a partitioned ballast so that the weight at the rear of the vessel can be unevenly distributed to one side or the other to generate a larger wave on the rider's preferred side. The fill level of each ballast may be separately controlled to control the weight distribution, and thus the pitch and roll, of the vessel. Alternatively or additionally, a wave alteration action includes instructions to a user to control the wave generation accessories, trimmable devices, and/or the vessel speed to adjust the wave pocket size or location.

In one embodiment, the control system may adjust the wave pocket size or location autonomously, controlling components such as the wave generation accessories, trimmable devices, and/or the vessel speed to manipulate the wake wave. In one embodiment, these adjustments may be made to conform a current wake wave and/or wave pocket to a target wake wave identified by a wave profile. As discussed in more detail below, the wave profile includes one or more saved dimensions or settings that characterize a wave, which may be quantified and stored based on measurements of a previous wake wave. The dimensions may include wave attributes such as wave height, wave pocket length, wave pocket width, wave pocket height, slope of a section of the pocket, location of the curl of the wake wave, angle of the crest of the wake wave compared to the heading of the marine vessel, angle of the wave with respect to a centerline axis of the vessel, aeration level, and/or distance of at least one wave feature from the marine vessel. When a wave profile is selected, the wave profile becomes the target wake wave that the control system strives to recreate through adjustment of propulsion characteristics, trim position of trimmable devices, and/or other adjustment of wave generation accessories. The target wake wave may include a geometry range that defines wave dimensions in relation to distance tolerances. The distance tolerances may account for the movement of the wakesurf rider and the movement of the wake wave and/or wave pocket. The geometry range may include at least one of a maximum height limit and a minimum height limit, a maximum length limit and a minimum length limit, and a maximum distance limit and a minimum distance limit.

FIG. 1 depicts a marine vessel 10 having a hull 12 that extends in a longitudinal direction between a bow 14 and a stern 16 with a transom 18 located at the stern 16. The hull 12 further extends between a port side 20 and a starboard side 22 in a lateral direction. A helm 25 is positioned laterally between the port and the starboard sides 20, 22 and longitudinally between the bow 14 and stern 16. The marine vessel 10 includes a control system 100 comprising one or a plurality of communicatively connected controllers, such as communicating on a CAN bus 120, an image system, and a propulsion system 140. The control system 100 includes one or more controllers 110 (such as a helm control unit and/or a propulsion control unit, or any other control module). The control arrangement shown in FIG. 1 and explained herein is merely exemplary and a person of ordinary skill in the art will understand in view of the present disclosure that other arrangements of communicatively connected control units and distribution of control functionality are within the scope of the present disclosure. A multitude of various control arrangements for the propulsion device(s), or marine drive(s), and wave generation accessories on a marine vessel, and for coordination of sensors and auxiliary devices with the function of the propulsion device(s), are well known in the art. The embodiments of marine vessels, marine drives, and control arrangements therefore are shown and described herein for purposes of exemplifying the systems and methods disclosed herein, and should not be considered limiting.

The propulsion system 140 includes at least one propulsion device 24, or marine drive, which is controlled via a powertrain computer 40 which, in the depicted arrangement, communicates with a central controller 110 via the CAN bus 120. The marine drive 24 is configured to generate thrust to propel the marine vessel 10 through water in a conventional manner, thus producing a wake. The marine drive 24, or marine drive, has a powerhead (e.g., an electric motor, an internal combustion engine, or a hybrid thereof) coupled in torque-transmitting relationship with a propeller to propel the marine vessel 10 in a manner known in the art. The propulsion device 24 is shown in FIG. 1 as an inboard motor, but could alternatively be an outboard drive, a stern drive, a pod drive, a jet drive, and/or the like, and could be any forward-facing or rear-facing marine drive. In some embodiments, a trim angle of the propulsion device 24 is adjustable in a manner known in the art, specifically by control of trim actuators (not shown) (which may be electric, hydraulic, and/or pneumatic). In the depicted embodiment, trim actuators of the propulsion device 24 are controlled via the powertrain computer 40 which communicates with the controller 110 via the CAN bus 120.

Figure 5:
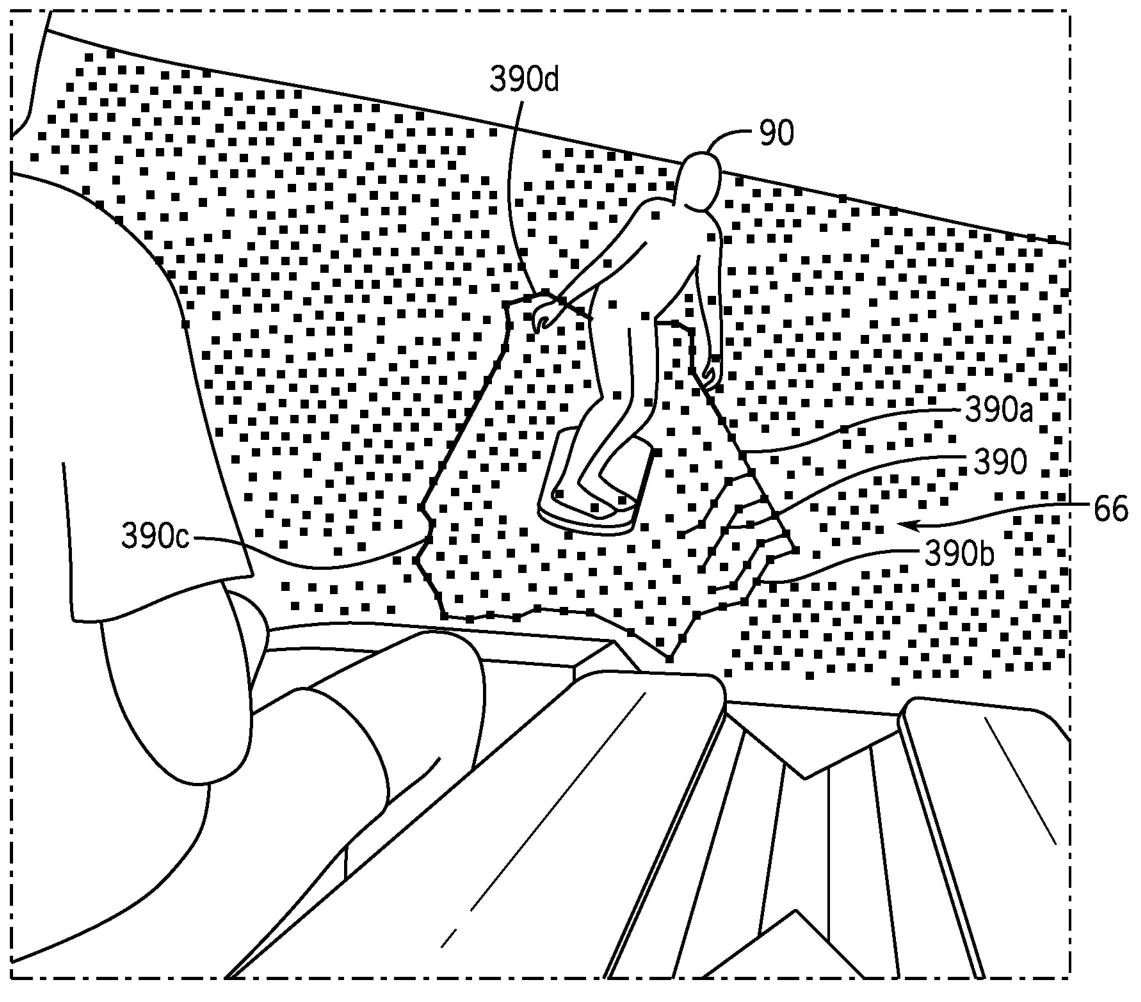
FIG. 5 is a view of an area behind a marine vessel exemplifying an image captured by a vision system according to one embodiment of the present disclosure.

The image system 150 is configured to image an area behind the marine vessel 10 to capture the wake wave and a rider thereon. As exemplified in the embodiment shown in FIG. 1, the image system 150 includes one or more image sensors cameras pointed toward the rear of the vessel, which may be communicatively connected to one or more image computers via a dedicated bus 130. The image system 150, which in one embodiment is a stereovision system, may use a configuration of multiple image sensors 52*a*, 52*b* with one or more corresponding image computer(s) 54*a*, 54*b*. In one embodiment of a stereovision configuration, at least one image computer 54 is configured to process image data captured by two image sensors 52*a*, 52*b* positioned at a known distance from one another and derive measurements of wave geometry based on differences/disparity in pixel location between images simultaneously captured by the image sensors 52*a*, 52*b*. As illustrated in FIG. 5, wave measurements may include wave height, length, width, slope, wave surface curvature, inflection point/area of the wave, wave pocket height, wave pocket area, wave pocket shape, distance from the marine vessel, and the like. Wave features may be identified based on the measured wave geometry, such as based on system identification of wave features such as the wave peak, curl, slope, inflection point, boundaries of the wave pocket, and distance of one or more of these features from the marine vessel. Each of the image sensors 52*a*, 52*b* has a field of view 152*a*, 152*b*, wherein the fields of view 152*a*, 152*b* overlap in at least a portion of an area 11 behind the marine vessel 10. The processed image data is communicated to the controller 110 via the image bus 130. The image sensors 52*a*, 52*b* are positioned to capture image data of the area 11 behind the marine vessel 10. In the illustrated embodiment, the sensors 52*a*, 52*b* are positioned on laterally opposing ends of a tower 56 extending over the helm 25. The sensors 52*a*, 52 may also be positioned on alternative raised features, such as a center console, a Bimini top, or the like which allow for lateral spacing between the first and second image sensors 52*a*, 52*b*.

The wakesurf monitoring system 160 includes the propulsion system 140, the image system 150, the control system 100, and at least one wave generation accessory, such as tabs, plates, wedges, or other elements mounted to the lower portion of the transom or on the rear side of the vessel, a ballast, or other device to increase or decrease a pitch of the marine vessel and control the size and shape of the wake wave. The wave generation accessory may be a trimmable device 32 which is movable and is controlled via the controller 110. In some embodiments, the propulsion device 24 constitutes the at least one trimmable device 32, such as a trimmable marine drive. Other examples of trimmable devices 32 include surf trim tabs, movable or retractable surf gates, one or more wakeplates, or other wave-shaping plates or elements, and/or the like. In the example in FIG. 1, the at least one trimmable device 32 is a first and second surf tab 32*a*, 32*b*, as it will be referred to herein. The surf tabs 32*a* and 32*b* are configured to adjust the displacement of the water behind the vessel to shape and/or locate the wave. The first and second surf tab 32*a*, 32*b* are positioned on opposing ends of the stern 16 and extend longitudinally rearwardly from the transom 18. The surf tab 32*a*, 32*b* are adjustable via tab actuators (not shown) which may be electric, pneumatic, and/or hydraulically actuated in a manner known in the art.

The helm 25 of the marine vessel 10 includes an input device 60, which is shown as a steering wheel but could also or alternatively include a joy stick, track pad, throttle lever, and/or any other user input device available in the art for providing throttle or steering input to control the marine vessel 10. A user interface includes a display 62 is also provided at the helm 25, which may include any digital or other display that provides a visual depiction of information relating to the marine vessel 10, such as vessel speed, engine status, fuel levels, direction, pitch, ballast levels, trim angles, wake modification alerts, etc. For example, the controller 110 may track and/or control the multitude of subsystems on the marine vessel 10 and may control the user interface to convey information pertaining to the marine vessel 10 and/or its subsystems, including generating a wave pocket alteration as described herein. To provide one example, the display 62 may be a VesselView display by Mercury Marine Corporation of Fond du Lac, Wisconsin. The user interface may also include a speaker 64 for providing audible output to a user, such as to be audible by a person standing at the helm 25.

Figure 2:
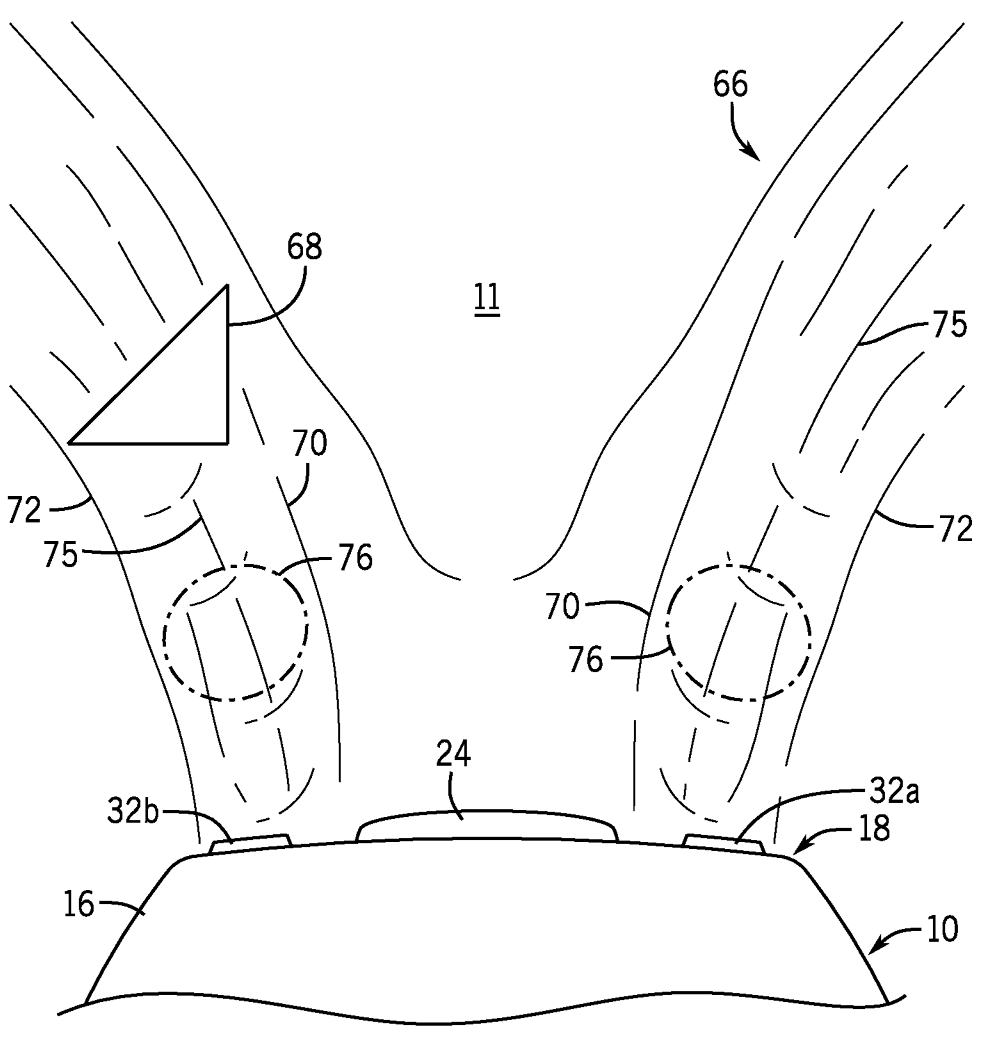
FIG. 2 shows a view of an area behind a marine vessel exemplifying an image captured by a vision system according to one embodiment of the present disclosure.
Figure 3:
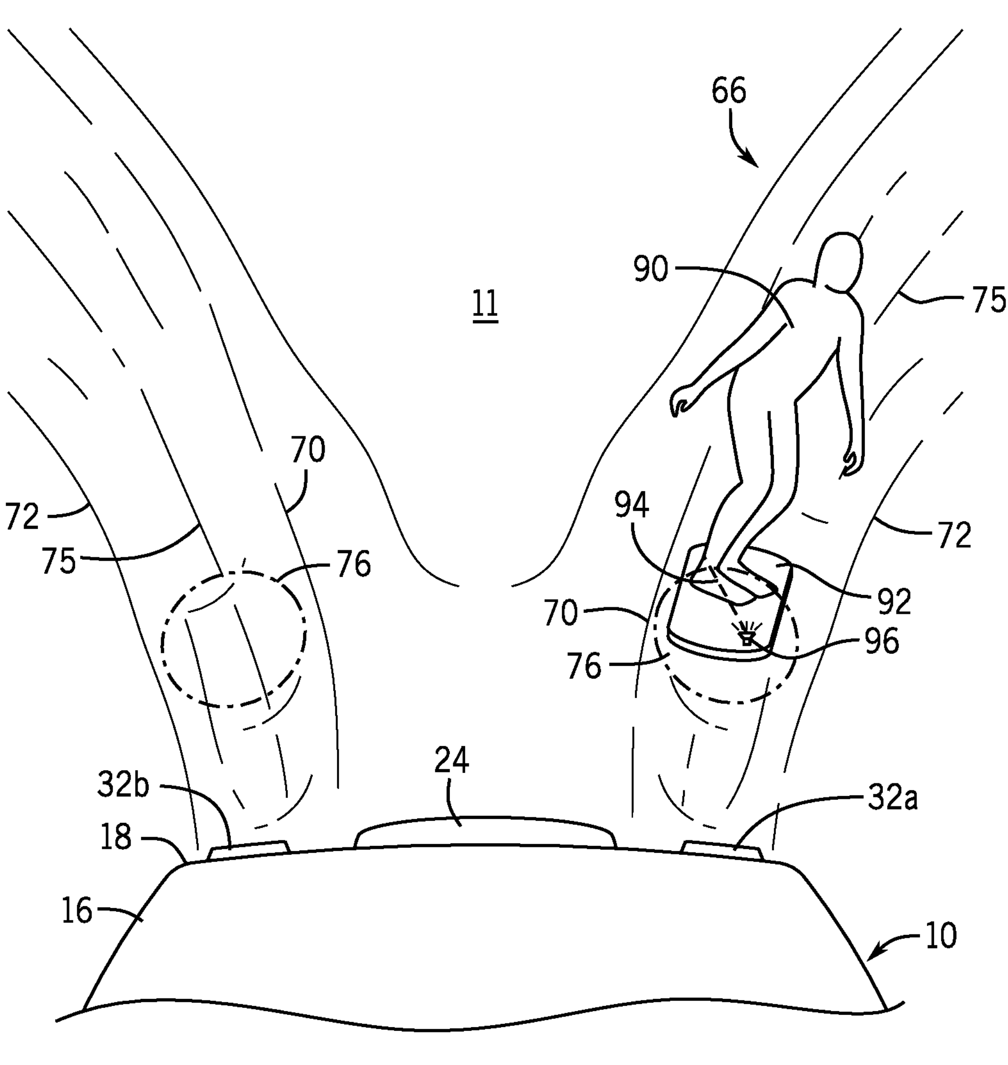
FIG. 3 is the view of the same area as in FIG. 3 and includes an image of a wakesurf rider.

FIGS. 2-3 show perspective views of the area 11 behind the marine vessel 10 which is to be captured in the image data via the image sensors 52*a*, 52*b*. A wake wave 66 is produced by the marine drive 24 propelling the vessel 10 through the water and extends laterally outward and longitudinally rearward from the stern 16. The wake 66 has a wave height 68, which may be defined by the vertical displacement of two diverging crest lines 70 from two diverging trough lines 72. Spaced vertically between the crest lines 70 and trough lines 72 are inflection lines 75, wherein the wake wave 66 breaks upon itself creating a tunnel-like form, sometimes called the "curl". In one embodiment, the wake wave 66 may be defined by an inflection point, which serves as a median between the inflection lines 75 and represents the break point of the wake wave 66. A wave pocket 76 is an area of the wave where the wakesurf rider 90 should be positioned to achieve optimal forward thrust from the wake wave 66. The wave pocket 76 is located adjacent to and outside of the inflection lines 75, and in some embodiments may be determined to be at a location where the wave height is the greatest. An optimal surf location range is defined as a range of locations with upper and lower bounds in the lateral, the longitudinal, and the vertical direction defining the wave pocket 76. Typically, it is desirable to maintain the pocket 76 within a threshold distance range from the transom 18, which will vary based on the speed, the pitch, and the drag coefficient of the marine vessel 10. In addition to vessel speed, the location of the wave or wave pocket 76 can also be affected by various controllable factors, such as the positioning of surf tabs, wakeplate or other wave-shaping element, the trim of marine drives, the fill level of a ballast tank(s), or the like. The speed and pitch of the vessel may be measured by sensor systems and provided to the control system 100, and the drag coefficient of the marine vessel 10 may be stored within the controller 110, including drag coefficient values based on parameters such as tab or plate position, fill level of a ballast tank, etc.

FIG. 3 shows the wakesurf rider 90 positioned on a board 92 in the area 11 behind the marine vessel 10. The image sensors 52*a*, 52*b* are configured to capture image data of the area 11 behind the marine vessel 10 and image computers 54*a*, 54*b* are configured to identify the rider 90 in the image data, such as using object identification and Computer Vision Machine Learning techniques. A rider location 94 is determined, such as using edge detection, computer vision machine learning (CVML), and/or object identification techniques to identify the rider 90, some portion of the rider, and/or the surf board 92, From there, the rider location 94 is determined. Alternatively or additionally, a marker 96 may be provided on the board 92 and/or the rider 90 which is a visually identifiable object that assists in identification of the rider location 94.

Figure 4:
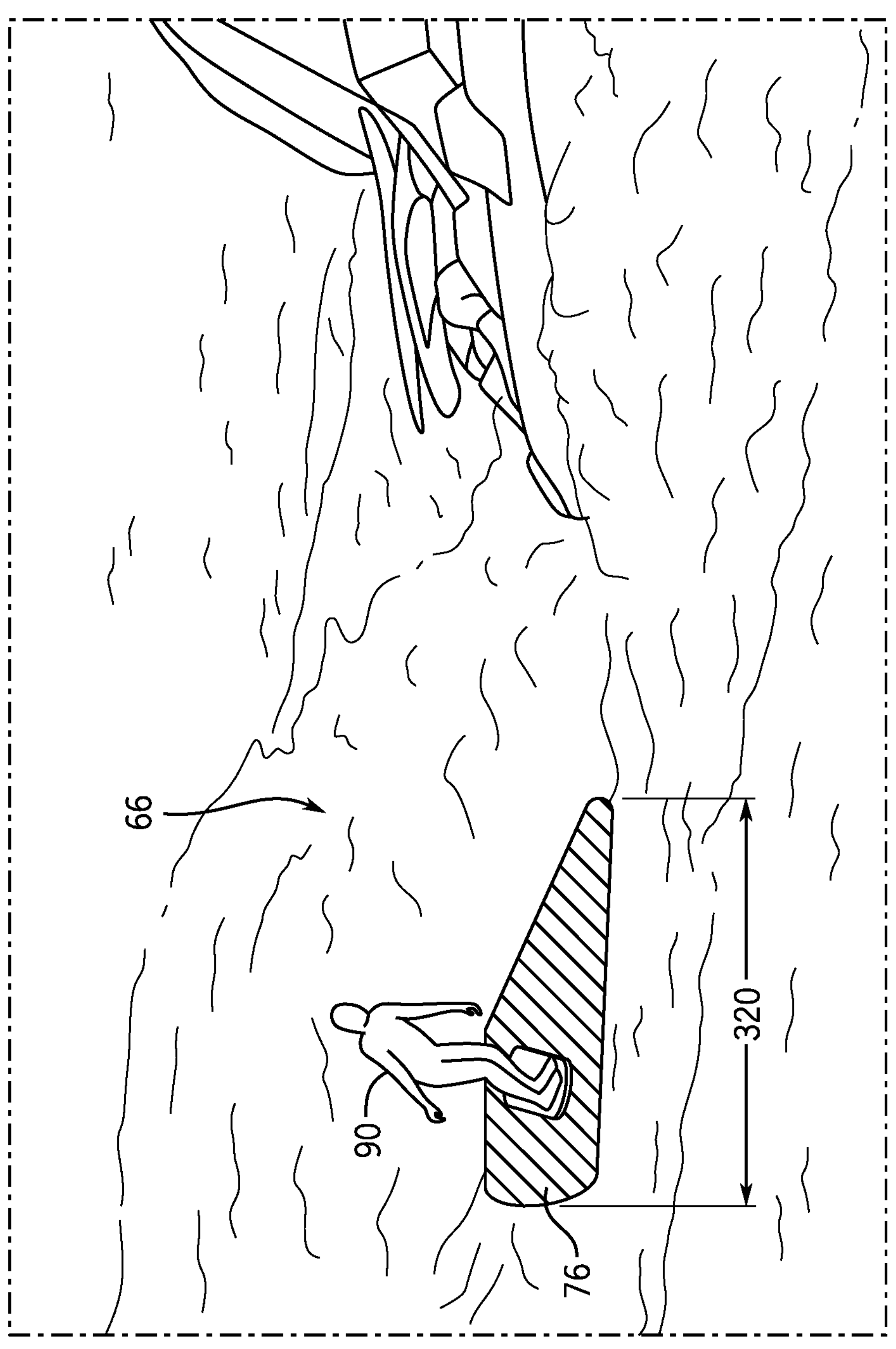
FIG. 4 is a side view of a wakesurf rider within an exemplary wave pocket, according to an embodiment of the present disclosure.

FIG. 4 is a side view of a wakesurf rider within an exemplary wave pocket 76. In one embodiment, the wave pocket length 320 is measured to monitor the size and shape of the wave pocket 76. The dimensions of the wave pocket 76 may be monitored by the wakesurf monitoring system to adjust the wake wave and the wave pocket 76 according to target values, such as representing the preferences of the wakesurf rider 90. In one embodiment, the wakesurf rider 90 may create a wake wave profile. A wake wave profile is one or more target wave dimensions or ranges, which may be stored and selected based on rider's preferences. The wakesurf monitoring system 160, per the control system 100, then operates to generate wave alteration action(s) based on the wake wave profile, such as to either automatically create and maintain a wave that meets the target or generate instructions to the operator to create and maintain the target wave geometry.

The wake wave profile may include dimensions captured by the image system of a wake wave 66 such that a wake wave can be characterized and saved as a wake wave profile for future replication. It can be difficult to recreate a wake wave 66 that has been previously surfed. Impediments to this replication include the current, the wind, the location of the marine vessel, the depth of the water, the power output fluctuations of the marine vessel, a difference in the angle of the marine drive 24, a trimmable device 32, and/or surf tabs 32*a*, 32*b* as non-limiting examples. By quantifying the dimensions of the wake wave 66 and/or the wave pocket 76, and by utilizing the systems and methods described herein, the control system 100 is enabled to recreate substantially the same surfing conditions by ensuring that the current wake wave 66 dimensions are within the stored and selected target wake wave geometry range. This may include a target range for one or more wave dimensions or could be a target range of relative values (e.g., wave pocket height vs. length, wave slope vs. distance from the marine vessel, peak location vs. wave pocket location, as non-limiting examples). Where a difference between a measured wake wave dimension and a target wake wave dimension or wake wave geometry range exceeds a threshold amount, the wakesurf monitoring system 160 generates a wave pocket alteration action based on the difference between one or more dimensions of the wake wave and the target wake wave geometry range.

These dimensions may include a wave height, the distance of at least one wave feature from the marine vessel, one or more edges of the wave pocket 76, the inflection point of the wake wave 66, the wave height, wave width, wave length, wave slope, and/or aeration indicator values (such as color, clarity, and/or smoothness). In one embodiment, the target wake wave geometry range includes a maximum height limit and/or a minimum height limit for determining the wave height. In another embodiment, the wave pocket length 320 includes a maximum length limit and/or a minimum length limit. These maximum and minimum values may operate as thresholds to determine the similarity between the current wake wave and the target wake wave.

The comparison of the current dimension of the wake wave to the target wake wave geometry range may be utilized to generate a wave pocket alteration action. In one embodiment, the wave pocket alteration action may include controlling at least one marine drive 24 to increase or decrease a speed of the marine vessel, controlling trim position of at least one of the marine drive trim, a trim tab, a wakeplate, and/or controlling a fillable ballast to increase or decrease the pitch of the marine vessel 10. Adjustments to one or more of these components may adjust one or more of the wave dimensions of the wake wave 66, bringing the current dimensions of the wake wave into alignment with the target wake wave geometry range.

Using the speed of the marine vessel 10 as an example, the control system 160 may measure the marine vessel's speed over ground, such as via a GPS-based speed measurement, or speed over water, such as via a pitot tube or paddle wheel. In another embodiment, the control system may convert the speed over ground into a speed over water for more accurate adjustments. The control system 160 may possess a correlated database or control logic storing vessel speeds (e.g. speed over water or speed over ground) to wave dimensions or speed change magnitudes to changes in wave dimensions. Thereby, the control system 160, the wake wave will elongate and get shorter. Alternatively or additionally, the wake wave may be elongated and shortened through the use of trimmable devices. Such as trimmable marine drive(s) 24, trim tabs, or wake plates. Similarly, using the trim actuators, the surf tabs, ballasts, and/or an IMU, the marine vessel 10 can adjust the pitch of the marine vessel 10. The change in pitch may change the height of the wake wave and/or may make the curvature of the wake wave steeper and shorter. In one embodiment, the feedback between the adjustments made to the speed and the shape of the wake wave may provide a closed-loop control where, after making the initial measurement, the control system can achieve the desired wake wave profile through minor adjustments to speed, trim position, ballast, etc.

In one embodiment, the target wake wave may be a saved wake wave profile associated with a specific wakesurf rider 90. For example, if a wakesurf rider has an enjoyable run on a specific wake wave, they may use the user interface to communicate to the wakesurf monitoring system 160 to store the recently-measured wake wave dimensions as a wake wave profile. Then the user may select this saved profile at any time in the future to replicate the saved wake wave. In another embodiment, the wake wave profile may be associated with another predetermined setting within the wakesurf monitoring system such as a difficulty level, or a method or type of wake surfing, as non-limiting examples. For example, a novice wakesurf rider 90 may select a "beginner" wake wave profile, which may adjust the dimensions of the wake wave to match a predetermined profile that may assist the novice wakesurf rider in stay up on the board. Similarly, the user may select a wake wave profile for certain tricks or for leisure "cruising", which may each have different wake wave dimensions intended to improve the performance of the desired activity. For example, the "tricks" wake wave profile may produce a wake wave 66 with a particular wave height, length, pocket location, and/or slope that is optimized for that trick.

In one embodiment, the shape of the wave pocket may be irregular. In addition to an offset distance from the back of the marine vessel, there's a range of allowable distance within the allowed tolerance of the wave pocket. This provides ample room to allow for forward, lateral, and/or backward movement from the wakesurf rider 90 while maintaining sufficient force from the wake wave to keep the board and wakesurf rider 90 in the wave pocket.

FIG. 5 is a view of an area behind a marine vessel exemplifying an image captured by an image system. In one embodiment, the image system may include a stereovision system comprising at least two cameras configured to image the area behind the marine vessel and generate depth information describing a water surface behind the marine vessel. The image system may use a method of identifying and measuring the water surface, such as a point cloud. By using a point cloud to characterize the wake wave 66, the control system may measure distances from the image system to point locations on the water surface, and to measure the distance from one point within the point cloud to another. The distance between identified and/or selected points, or lines 390, 390*a*, 390*b*, 390*c*, 390*d* identified based on the points, may be utilized to determine the measurements for one or more wave dimensions. In one embodiment, points may be identified and/or selected for measurement based on comparative values. For example, the control system 100 may be configured to identify a series of points have a relatively linear alignment as the crest, which may be used alone or in combination with other factors such as slope and height to identify the crest of the wake wave. In one embodiment, a CVML model may supplement numerical analysis of depth information in the image data, such as being trained to identify the crest or other features. Other dimensions that might be identified by a similar process may include the slope of the wake wave, one or more boundaries of the wave pocket, and the wave wake height, as non-limiting examples. In another embodiment, the aeration of the wave near the pocket may be identified and/or quantified as a monitored wake wave dimension, such as using a trained CVML model. For example, and as discussed in more detail below, one or more aeration indicators such as color and/or clarity of the water in the wave pocket may indicate whether the water is significantly aerated. The aeration level of the water in the wave pocket should be low, indicating that the wake wave is a sufficiently clean and/or smooth such that it is conducive to wake surfing.

In one embodiment, lines 390, 390*a*, 390*b*, 390*c*, 390*d* formed by point or depth measurements may be used to determine the wake wave dimension(s) and characterize the wake wave 66 and/or the wave pocket. Tangential lines may be used to determine the height and slope of the wake wave, where the curl is, height, length, and the angle of the wake wave 66 relative to an axis of the vessel, such as the centerline axis of the boat, as non-limiting examples. The lines 390*a*, 390*b*, 390*c*, 390*d* and patterns formed by points in a point cloud or other depth measurement points can then be used to identify the wave pocket. In one embodiment, measurements from the wave peak line 390*a* to the lowest point of the trough may define the height of the wave pocket. In another embodiment, this measurement may provide the height of the wake wave, with the wave pocket being an offset from the total height of the wake wave. Lines defining edges 390*a* and 390*c* may determine the width of the wave pocket. Using relatively linear measurements, such as the crest of the wave as depicted with 390*a*, the control system may compute the angle of the wake wave relative to the boat which may indicate how much push the wake wave can exert on the wakesurf rider. The width of the wake wave pocket may be determined as a distance between lines 390*a* and 390*c*, such as the average or mean distance between the lines, a minimum or maximum distance between the lines, or a distance at a given region of the surf pocket such as the region containing the maximum slope or terminating at the highest peak. The target wave pocket width would be defined in the same way. Likewise, the length of the wake wave pocket may be similarly determined by measuring the distance between predefined points on lines 390*b* and a line defining the top side of the pocket (not shown). In some implementations, borders of the wave pocket and/or wake wave 66 may be smoothed prior to determining the wake wave or wave pocket dimensions.

Using methods of image processing, such as a point cloud measurement, to measure wave dimensions such as wake wave slope, height, length, curvature, location, curl, and angle relative to the marine vessel, features are identified in the image data that geometrically define the wave pocket and/or wake wave 66. Changes in these measurements may be associated with wave pocket alteration actions mentioned previously, such as adjusting marine drive thrust output or trim, trim tab position, wakeplate position, and/or a fill level of a fillable ballast to increase or decrease speed and/or pitch of the marine vessel. As the control system forms associations between the wave pocket alteration actions and the changes in the wake wave 66 dimensions, the control system may refine the amount of adjustment required to match the dimensions of the wake wave with the dimensions of the target wake wave geometry range.

In one embodiment, measurements of the wake wave such as the height, the length, the slope, the curvature of the wake wave 66, and the location of the curl may be augmented by CVML. Using methods such as segmentation, CVML modeling may enable identification between wave features or wave behavior indicators, such as the crest of the wake wave 66 starting to break and a clean or smooth crest by recognizing when the crest of the wake wave begins to appear bubbly or soft. For example, one or more CVML models may be trained to identify and/or monitor one or more aeration indicator(s), such as color, clarity, and/or smoothness of the water surface within or around the boundaries of the wave pocket to determine whether the water is too aerated. For example, when the water within the wave pocket has less than a threshold smoothness, a color that is too light (exceeding a threshold lightness), and/or less than a threshold clarity level, then a wave alteration action may be generated to decrease the aeration level of the water within the wave pocket. When significant aeration is detected, the wave alteration action may include the adjustment of the trim, the center tab, and/or the ballast to adjust wave aeration. For example, the placement of weight through the ballast tanks may be adjusted to adjust the aeration of the wake wave. For example, upon determination that the wake wave exceeds an aeration threshold, the control system may reallocate some of the ballast from the rear tanks and to the bow, or otherwise to decrease the rear ballast. Alternatively or additionally, the wake wave alteration action may include adjusting trim of one or more trimmable devices, such as trim the marine drives, trim tabs, or wake plate, to reduce vessel tilt and/or how deeply the stern is riding.

Similarly, these methods of tracking and identification may be used to identify the location of the wakesurf rider 90. Alternatively or additionally, the wakesurf monitoring system 160 may be configured to monitor and adjust the wake wave according to the position of the wakesurf rider 90. For example, the wakesurf monitoring system 160 may be configured to generate wave pocket alteration actions that keep the wakesurf rider in the middle of the wave pocket. This location may provide the most push from the wake wave and assist in keeping the wakesurf rider from falling, and thus may be particularly helpful if the rider is a novice and thus may be a control feature enabled or generated in a "beginner mode". In another embodiment, the wakesurf monitoring system may be configured to monitor both the wakesurf rider 90 and the wake wave 66, and thus to generate wave alteration actions to maintain a target wake wave geometry range and to adjust the wave pocket based on the rider location on the wave. In this situation, adjustments by wave pocket alteration actions may endeavor to bring the wakesurf rider 90 and the wake wave 66 into the correct position and configuration, depending upon which orientation and adjustment is most effective and/or efficient.

Figure 6:
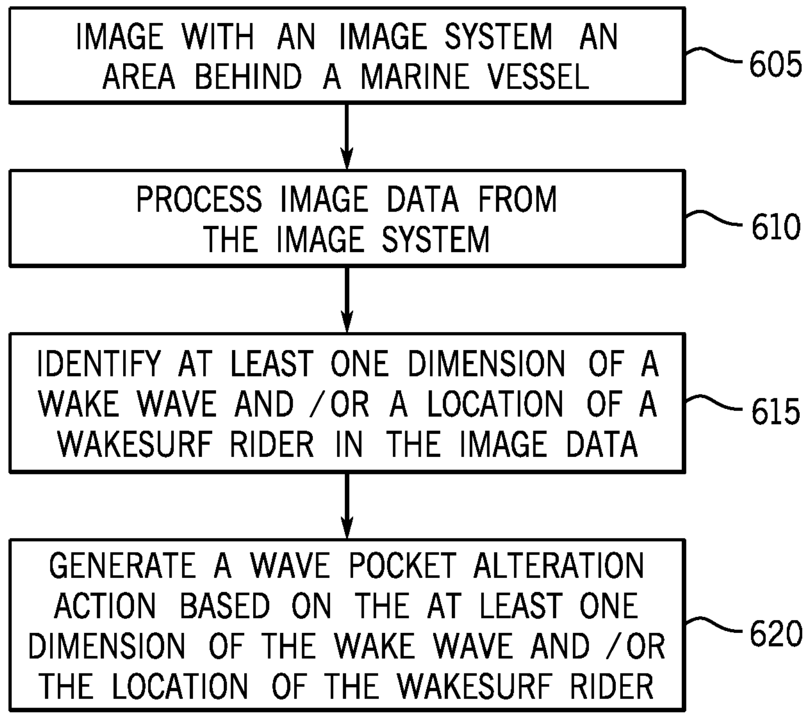
FIG. 6 shows an exemplary method of wake wave monitoring according to one embodiment of the present disclosure.

FIG. 6 shows an exemplary method of wakesurf monitoring according to one embodiment of the present disclosure. At 605, an area behind a marine vessel is imaged with an image system. At 610, the image data from the image system is received and processed, wherein the image data contains at least one image of the area behind the marine vessel. For example, a point cloud identifying the water surface may be generated and/or a wake surf rider and/or surf board may be identified. At 615, at least one dimension of a wake wave and/or a location of a wakesurf rider is identified in the image data. At 620, a wave pocket alteration action is generated based on at least one dimension of the wake wave and/or the location of the wakesurf rider.

Figure 7:
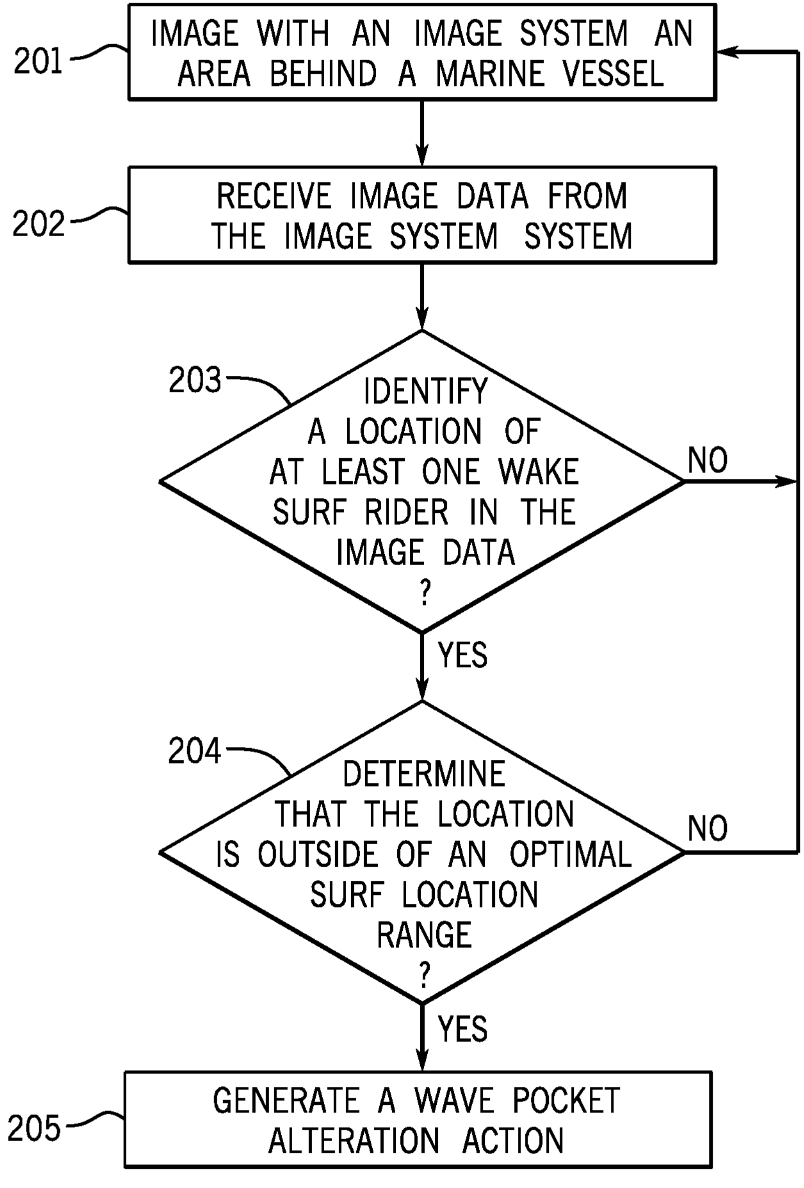
FIG. 7 shows an exemplary method of wake wave monitoring according to one embodiment of the present disclosure.

FIG. 7 depicts another embodiment of a method of wakesurf monitoring. At step 201, an area 11 behind a marine vessel 10 is imaged by image system 150 comprising at least two image sensors 52*a*, 52*b* configured as stereovision cameras to image behind the stern 16 of the marine vessel 10. The image sensors 52*a*, 52*b* are positioned and configured on the marine vessel 10 such that fields of view 152*a*, 152*b* are extending away from the stern 6 to capture image data of at least a wave pocket 74 behind the vessel 10. The angles and size of the fields of view 152*a*, 152*b* can be impacted by a variety of factors including image sensor placement, lens size, sensor type, etc. It is preferable that the sensors 52*a*, 52*b* are placed in a position so that substantially all of the potential locations where the wave pocket 76 will be located and so that the wakesurf rider 90 can be captured within the image data. The image system 150, such as wherein the image sensors 52*a*, 52*b* are stereovision cameras, are capable of determining wave geometry based on the depth and disparity measurements derived by comparing the images captured by the sensors, thus allowing the image system 150 to directly measure a wave geometry and derive geometric insights regarding the wave 66 and wave pocket 76.

The image data is received from the image system 150 and processed via image computers 54*a*, 54*b* at step 202. The system 100 then determines a rider location 94 of the wakesurf rider 90 in the image data at step 203. The method proceeds to step 204, and the control system 100 determines if the rider location 94 is outside of an optimal surf location range. The optimal surf location range may be defined as a range of locations with upper and lower bounds in the lateral, the longitudinal, and the vertical direction defining a wave pocket location, or may be defined as a range of relative positions (or displacements) from a predefined feature of the wake wave and the wakesurf rider. The location of the wave pocket 76 can be relative to a variety of features of both the marine vessel 10 and the wake wave 66. Examples of located features of the marine vessel 10 in the image data include a transom 18, a marine drive 24, and/or the like. Examples of predefined features of the wake wave 66 include crest line 70, inflection line 75, a trough line 72, a wave peak or trough, whitewater, a border location or feature of the surf pocket lateral sides of the pocket, etc., and/or any of the wave features described herein.

In some embodiments, the location of the wave pocket 76 is determined using a predetermined and/or configurable drag coefficient of the marine vessel 10, such as based on current position and/or fill condition of the wave generation accessories. In some embodiments, the user may be able to selectively increase or decrease a drag coefficient to account for variables such as crew weight, gear weight, etc. If the system 100 does not determine that the rider location 94 is outside of the optimal surf location range, the method loops back to step 101. If the rider location 94 is determined to be outside of the optimal surf location range, the method proceeds to step 205.

In alternative embodiments, the system 100 is configured to identify at least one wave 66 in the image data and determine at least one dimension of the wave 66 at step 203. Examples of dimensions of the wave 66 are described above and/or include a wave height 68, a distance from an inflection line 75 to a crest line 70 or trough line 72, the presence of a whitewater, and/or the like. In such an embodiment, at step 204, the system determines if the at least one dimension of the wake wave 66 is outside of a desired target wake wave geometry range. The target wake wave geometry range includes a maximum and a minimum limit for at least one dimension of the wave 66, centering about the dimension of the wave 66 which provides the smallest relative distance between the rider location 94 and the wave pocket 76. For example, the target wake wave geometry can include a maximum and a minimum wake wave height limit centering about a wave height 68. If the system 100 determines that the at least one dimension of the wake wave 66 is within the target wake wave geometry range, the method loops back to step 201. If the control system 100 determines that the at least one dimension of the wake wave 66 is outside of the target wake wave geometry range, the method proceeds to step 205.

In further alternative embodiments, the system 100 is configured to identify a wake wave geometry at step 203. Examples of a wake wave geometry include the presence of whitewater, or recognition of a shape of a type of wave utilizing point cloud and/or CVML, as described above.

In this embodiment, the system determines if the wake wave geometry is within an target geometry range at step 204. The target wake wave geometry range provides a degree of freedom from which the identified wake wave geometry can vary from an target wake wave geometry. An target wake wave geometry is a wake wave geometry that provides the smallest relative distance between the rider location 94 and the wave pocket 76. If the system 100 determines that the wake wave geometry is within the target geometry range, the method loops back to step 201. If the control system 100 determines that the wake wave geometry is outside of the target geometry range, the method proceeds to step 205.

At step 205, the control system 100 generates a wave alteration action. For example, the wave alteration action may include an action configured to decrease the relative distance between the rider position and location 94 and a feature of the wave pocket 76. In some embodiments, the wave alteration action includes generating a wave pocket alert on a user interface. The wave pocket alert may provide a variety of alerts to an operator of the vessel 10, including a notification that the wakesurf rider 90 is outside on the optimal surf location range or an instruction to control propulsion output by one or more marine drives 24 and/or a position of a surf tab 32*a*, 32*b*, or other wake altering devices.

Alternatively or additionally, the wave alteration action can include controlling a trim of the marine drive 24 via trim actuators 28, or controlling at least one wave generation accessory to alter the location of the wave pocket 76. Alternatively or additionally, the wave alteration action includes controlling the marine drive 24 to increase or decrease a speed of the vessel 10 to alter the location of the wave pocket 76 relative the stern 16, and in turn, the relative distance between the rider location 94 and the wave pocket 76. Alternatively or additionally, the wave alteration action includes controlling steering position of a steerable marine drive and/or rudder in order to adjust a heading of the marine vessel (which may be a temporary adjustment), in turn adjusting the location of the wave relative to the rider. Alternatively or additionally, the wave alteration action includes instructing a user on how to change the vessel speed and/or one or more wave generation accessories to effectuate the needed adjustment to the wave pocket 76 compared to the rider location 94. A variety of alternative methods of altering the wake wave and/or the relative distance between the rider location 94 and the wave pocket 76 can be used, including modifying the fill level of the ballast tank, instructing an operator to adjust the trajectory of the vessel, and/or the like.

In some embodiments, the control system 100 is configured to allow a user to select and/or define one or more wave dimensions or wave geometry values, which are then set as a target wave value(s) for operating the wave generation accessories and/or the marine drives to achieve the target wave dimensions. Such user set values may be utilized as target wake wave geometry range(s) for controlling the wake surf wave. The image data captured by the image system 150, such as by two sensors 52*a*, 52*b* arranged as stereovision cameras, is used as feedback for controlling the wave generation accessories for achieving the target wave geometry.

Alternatively or additionally, the system may be configured to allow a user to save a given wave geometry from a surfing session, as described above, wherein the control system 100 may be configured to save one or more measured wave dimensions measured based on image data from the image system 150. The saved wave dimension(s) may then be used as target values for controlling a future wave. However, environmental and vessel conditions impact the wave generation (water surface, wind, current, fuel level, number of people in the boat, where people are in the boat, etc.). Thus, simply utilizing the same saved propulsion control values (speed, tab positions, ballast tank fill level, etc.) will not consistently produce the same wave. Direct measurement and adjustment to target geometry, as described herein, is a more reliable method of attaining the target wave geometry. Thereby, the system 100 can be configured to recreate a target wave selected by a user using the image data as feedback to ensure that the target wave geometry value(s) are recreated.

In certain examples, the control system 100 may also be configured to save control values for the wave generation accessories and the propulsion system, propulsion and wave generation accessory setting values, that are associated with the target values based on the saved session, such as including propulsion and/or vessel speed, marine drive trim position, trim tab or plate position(s), ballast fill level, etc. Those saved control values can then be used as starting values for the control system 100. The starting values can then be modified and fine-tuned by the control system 100 based on feedback from the image data.

Figure 8:
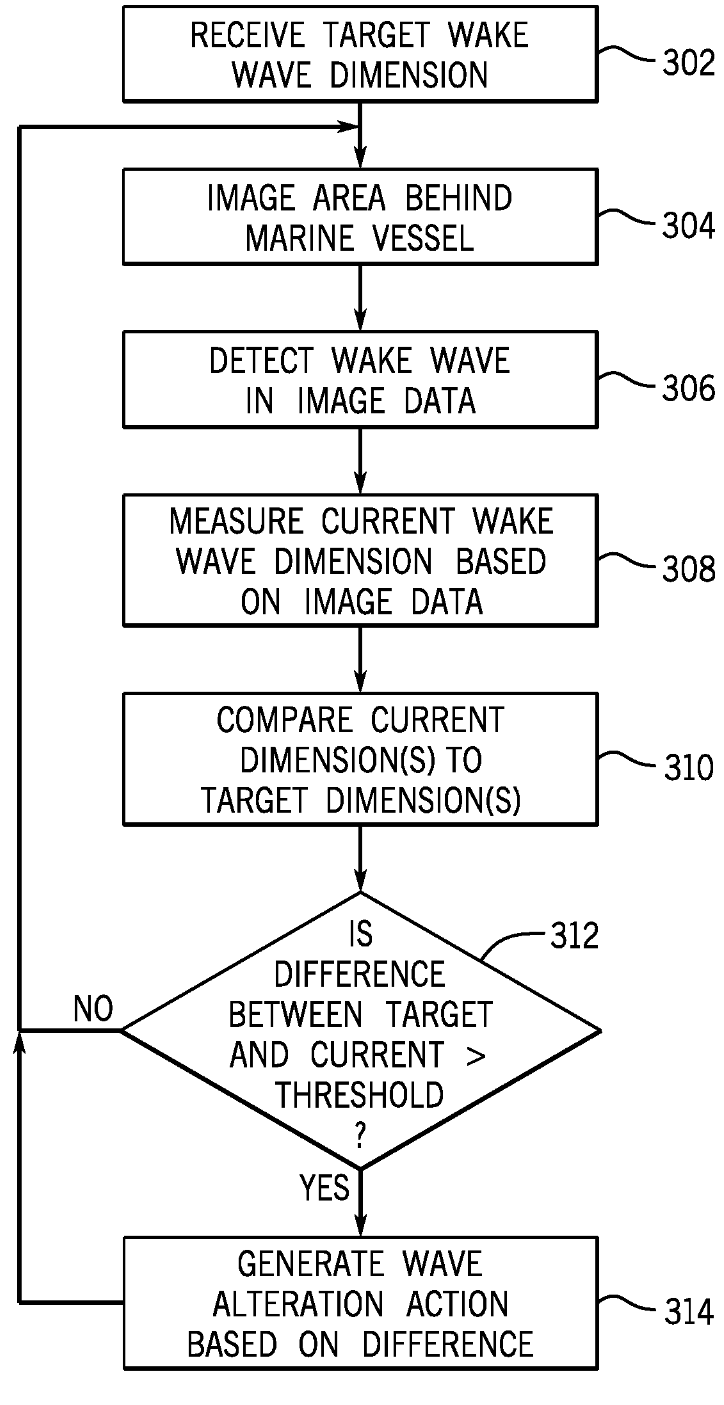
FIG. 8 illustrates another exemplary method of wake wave monitoring according to another embodiment of the present disclosure.

FIG. 8 depicts one example of a method of wakesurf monitoring based on user-set parameters, which may be a wake wave profile as described above. The method of controlling a wake wave behind the vessel includes receiving a target wake wave dimension at step 302. For example, the wake wave dimension may include a wave height and/or a wave location, such as a distance behind the marine vessel for the location of the wave pocket or wave peak, or any other wave dimension described herein. The target wake wave dimension may be inputted or selected by a user, such as via a user interface configured to communicate with the control system 100. Alternatively, the target value may be set based on a previous wake wave captured by the image system 150, as described above. In such an example, the control system 100 may also have stored corresponding propulsion and wave generation accessory setting values that correspond to the target wake wave dimension, which can be effectuated accordingly by the control system 100.

The area behind a marine vessel is then imaged at step 304 using the image system 150 and image data is generated as described above. A wake wave is detected in the image data at step 306, such as based on dimensions or patterns identified in a point cloud representing the water surface or using image processing techniques such as edge detection and object recognition (e.g., via a CVML model trained to detect a wave). One or more dimensions of the wake wave are then identified at step 308 based on the image data, which represent current measurements of the wake wave. The current wave dimensions measured based on the image data preferably correlate with the target wake wave dimensions to enable comparison. The current wake wave dimensions are compared to the target wake wave dimensions at step 310 and a difference is determined. If the difference between the current and target values differs by more than a threshold difference at step 312, then a wave alteration action is determined and generated at step 314. As described above, the wave alteration action may include a propulsion adjustment and/or a wave generation accessory adjustment, which may be effectuated autonomously by the control system 100 or may be provided as an instruction to the user to effectuate.

Alternatively or additionally, a wakesurf rider location is identified in the image data, such as based on identified dimensions and/or patterns representing the water surface or using image processing techniques such as edge detection and object recognition. In one embodiment, CVML modeling may be configured to identify parts of the wake wave and/or the wakesurf rider. For example, one or more CVML models may be trained to identify the wakesurf rider, the surf board, and/or one or more features of the wake wave. Detection of the wake wave, the wakesurf rider, and/or the board may provide relative positional information, such as where the board is in relation to the location of the wake wave pocket. CVML modeling may also be used to detect patterns in image data over time, such as changes in the shape or form of the water over multiple images indicating which changes in propulsion or vessel pitch may be the most effective response for altering the wave to reach the target wake wave geometry range.

Figure 9:
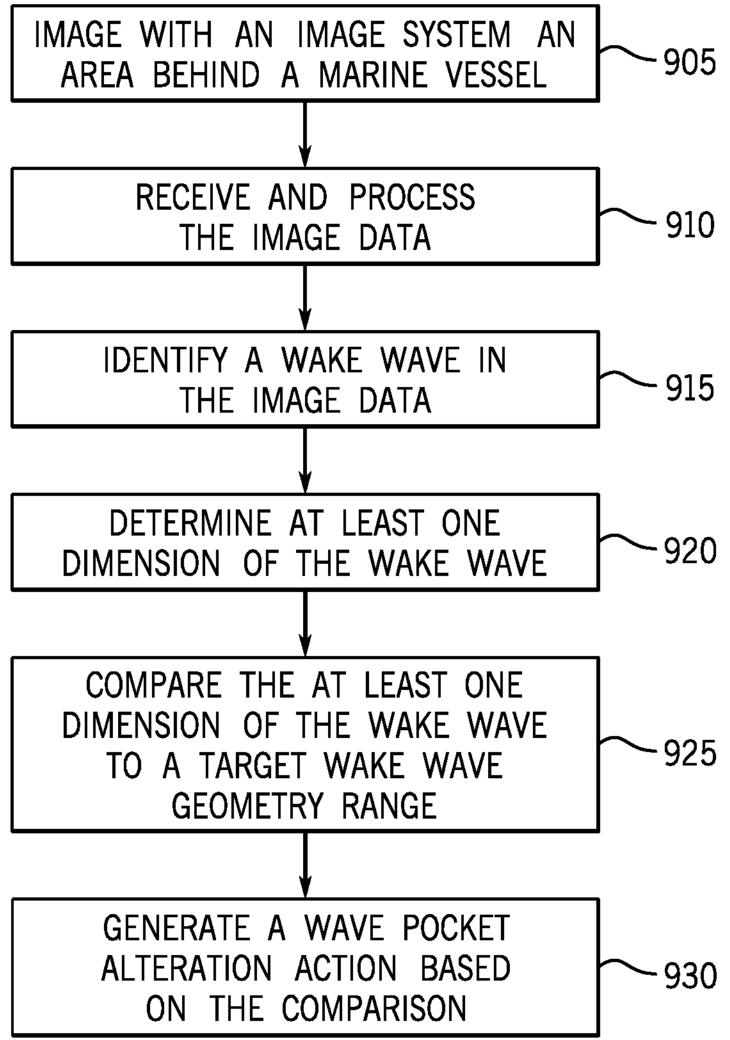
FIG. 9 illustrates another exemplary method of wake wave monitoring according to another embodiment of the present disclosure.

FIG. 9 illustrates another exemplary method of wakesurf monitoring according to the present disclosure. At 905, an area behind a marine vessel is imaged with an image system. At 910, image data containing at least one image of the area behind the marine vessel is received from the image system and processed, such as to generate a point cloud describing the water surface, identify wave feature locations, identify the wakesurf rider and/or surf board, etc. At 915, a wake wave is identified based on the processed image data. At 920, at least one dimension of the wake wave is determined. At 925, the at least one dimension of the wake wave is compared to a target wake wave geometry range. In one embodiment, the at least one dimension of the wake wave includes a wave height, and wherein the target wake wave geometry range includes a maximum height limit and a minimum height limit. In another embodiment, the at least one dimension of the wake wave includes a wave pocket length, and wherein the target wake wave geometry range includes a maximum length limit and a minimum length limit. In another embodiment, the at least one dimension of the wake wave includes a distance of at least one wave feature from the marine vessel, and wherein the target wake wave geometry range includes a maximum distance limit and a minimum distance limit. In one embodiment, the at least one dimension of the wake wave includes identifying an inflection point in the wake wave, wherein at least one of the at least one dimension of the wake wave is based on the inflection point. At 930, a wave pocket alteration action is generated based on the comparison. In one embodiment, the wave pocket alteration action includes controlling at least one marine drive to increase or decrease a speed of the marine vessel, controlling a trimmable device, and/or controlling a wave generation accessor, as is described above.

Figure 10:
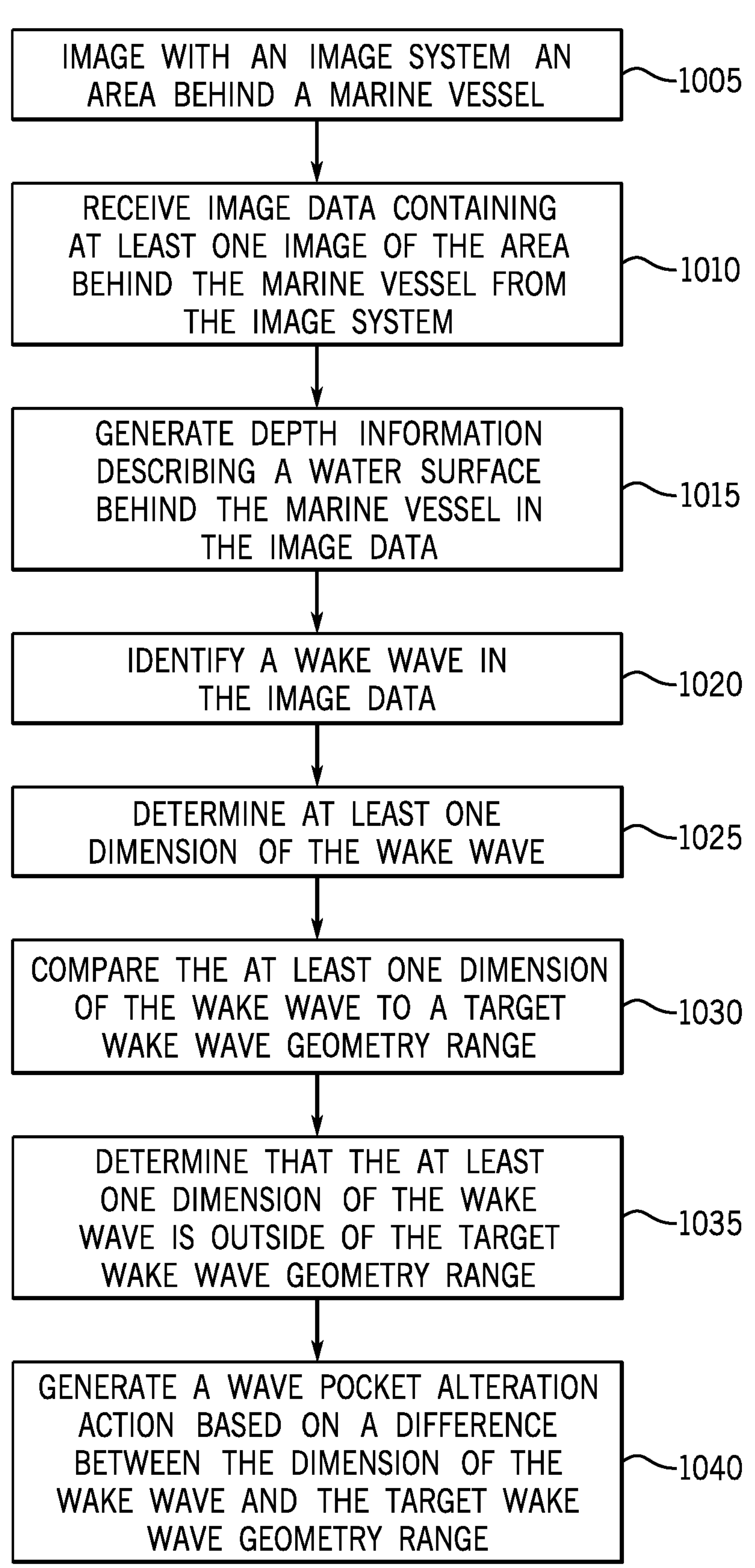
FIG. 10 illustrates another exemplary method of wake wave monitoring according to another embodiment of the present disclosure.

FIG. 10 illustrates another exemplary method of wakesurf monitoring according to another embodiment of the present disclosure. At 1005, an area behind a marine vessel is imaged with an image system. At 1010, image data containing at least one image of the area behind the marine vessel is received from the image system. At 1015, the image data is processed to generate depth information (e.g., a point cloud) describing a water surface behind the marine vessel in the image data. At 1020, a wake wave is identified in the image data, such as based on the depth information. At 1025, at least one dimension of the wake wave is determined, such as based on the identified wake wave and the depth information. At 1030, the at least one dimension of the wake wave is compared to a target wake wave geometry range. At 1035, it is determined that the at least one dimension of the wake wave is outside of the target wake wave geometry range. At 1040, a wave pocket alteration action is generated based on the difference between the dimension of the wake wave and the target wake wave geometry range to bring the dimension of the wake wave toward the target geometry range and thus decrease the difference between the measured value and the target value. In one embodiment, the wave pocket alteration action includes controlling at least one of marine drive trim, a trim tab, a wakeplate, and a fillable ballast to increase or decrease a pitch of the marine vessel.

Figure 11:
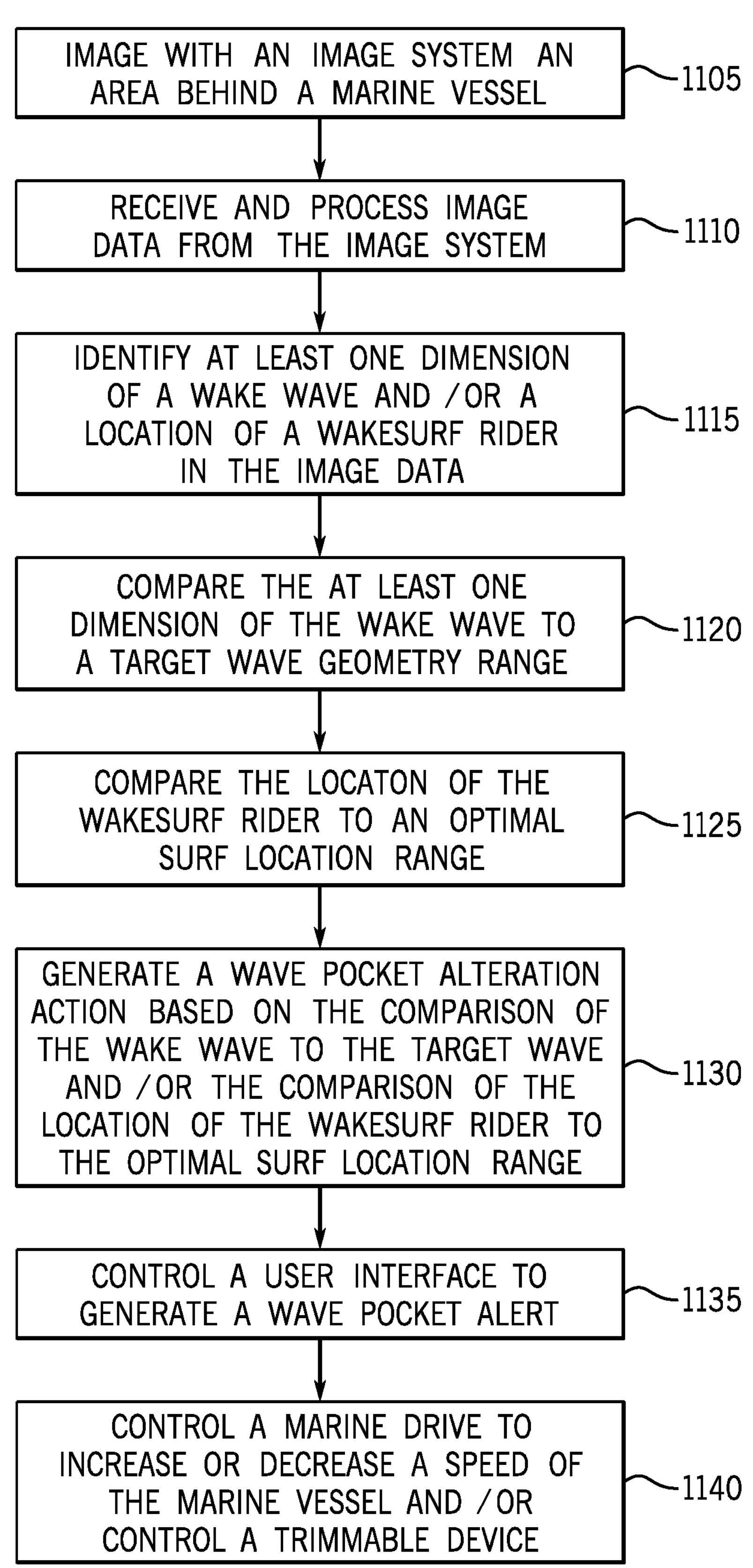
FIG. 11 illustrates another exemplary method of wake wave monitoring according to another embodiment of the present disclosure.

FIG. 11 illustrates another exemplary method of wakesurf monitoring according to another embodiment of the present disclosure. At 1105, an area behind a marine vessel is imaged with an image system. At 1110, the image data from the image system is received and processed, such as to generate a point cloud describing the water surface, identify wave feature locations, identify the wakesurf rider and/or surf board, etc. At 1115, at least one dimension of a wake wave and/or a location of a wakesurf rider is identified in the processed image data. At 1120, the at least one dimension of the wake wave is compared to a target wave geometry range. In one embodiment, the at least one dimension of the wake wave includes a wave height, a wave pocket length, and/or a distance of at least one wave feature from the marine vessel and the target wake wave geometry range includes at least one of a maximum height limit and a minimum height limit, a maximum length limit and a minimum length limit, and a maximum distance limit and a minimum distance limit. At 1125, the location of the wakesurf rider is compared to an optimal surf location range. In one embodiment, the location of the wakesurf rider includes a relative location compared to a wave feature and/or a distance of the wakesurf rider with respect to the marine vessel, and the optimal surf location range includes a minimum relative location and a maximum relative location and/or a minimum distance and a maximum distance from the marine vessel or from a plane of the stereo vision cameras. At 1130, a wave pocket alteration is generated based on the comparison of the wake wave to the target wave and/or the comparison of the location of the wakesurf rider to the optimal surf location range. In one embodiment, generating a wave pocket alteration action includes controlling a user interface to generate a wave pocket alert instructing operation of a marine drive, a trimmable device, and/or a fillable ballast to adjust at least one of a speed or a pitch of the marine vessel. In another embodiment, generating a wave pocket alteration action includes controlling a marine drive to increase or decrease a speed of the marine vessel and/or controlling a trimmable device or a fillable ballast to increase or decrease a pitch of the marine vessel.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A wakesurf monitoring system comprising:

an image system configured to image an area behind a marine vessel;

a control system comprising one or more controllers communicatively connected via a network on the marine vessel, the control system configured to:

receive image data containing at least one image of the area behind the marine vessel from the image system;

identify a wake wave in the image data;

determine at least one dimension of the wake wave;

compare the at least one dimension of the wake wave to a target wake wave geometry range; and generate a wave pocket alteration action based on the comparison.

2. The system of claim 1, wherein the image system includes a stereovision system comprising at least two cameras configured to image the area behind the marine vessel and generate depth information describing a water surface behind the marine vessel.

3. The system of claim 1, wherein the control system is further configured to determine that the at least one dimension of the wake wave is outside of the target wake wave geometry range and generate the wave pocket alteration action based on a difference between the dimension of the wake wave and the target wake wave geometry range.

4. The system of claim 1, wherein the at least one dimension of the wake wave includes a wave height, and wherein the target wake wave geometry range includes a maximum height limit and a minimum height limit.

5. The system of claim 1, wherein the at least one dimension of the wake wave includes a wave pocket length, and wherein the target wake wave geometry range includes a maximum length limit and a minimum length limit.

6. The system of claim 1, wherein the at least one dimension of the wake wave includes a distance of at least one wave feature from the marine vessel, and wherein the target wake wave geometry range includes a maximum distance limit and a minimum distance limit.

7. The system of claim 1, wherein determining the at least one dimension of the wake wave includes identifying an inflection point in the wake wave, wherein at least one of the at least one dimension of the wake wave is based on the inflection point.

8. The system of claim 1, wherein the wave pocket alteration action includes controlling at least one marine drive to increase or decrease a speed of the marine vessel.

9. The system of claim 1, wherein the wave pocket alteration action includes controlling at least one of marine drive trim, a trim tab, a wakeplate, and a fillable ballast to increase or decrease a pitch of the marine vessel.

10. The system of claim 1, wherein the wave pocket alteration action includes controlling trim position of a trimmable device to increase or decrease a pitch of the marine vessel.

11. The system of claim 1, wherein the wave pocket alteration action includes controlling a user interface to generate a wave pocket alert.

12. The system of claim 11, wherein the wave pocket alert includes an instruction to control at least one of a marine drive, a trimmable device, or a fillable ballast to adjust at least one of a speed or a pitch of the marine vessel.

13. The system of claim 1, wherein the control system is further configured to:

identify a location of a wakesurf rider in the image data; and generate the wave pocket alteration action based further on the location of the wakesurf rider.

14. The system of claim 13, wherein the control system is further configured to compare the location of the wakesurf rider to an optimal surf location range and generate the wave pocket alteration action based further on the comparison.

15. The system of claim 14, wherein the optimal surf location range includes a range of displacements between a predefined feature of the wake wave and the wakesurf rider.

16. The system of claim 14, wherein the control system is further configured to determine a distance of the wakesurf rider with respect to the marine vessel, and the optimal surf location range includes a range of distances between the marine vessel and the wakesurf rider.

17. The system of claim 13, wherein the wave pocket alteration action includes an instruction to control at least one of a speed of a marine drive, a trim position of a trimmable device, a fillable ballast or a steering position of the marine drive.

18. A method of monitoring wakesurf, the method comprising:

imaging with an image system an area behind a marine vessel;

receiving image data from the image system, the image data containing at least one image of the area behind the marine vessel;

with a control system comprising one or more controllers communicatively connected via a network on the marine vessel:

identifying at least one of at least one dimension of a wake wave and/or or a location of a wakesurf rider in the image data; and generating a wave pocket alteration action based on the at least one of the at least one dimension of the wake wave or the location of the wakesurf rider.

19. The method of claim 18, further comprising comparing the at least one dimension of the wake wave to a target wake wave geometry range and generating the wave pocket alteration action based on the comparison.

20. The method of claim 19, wherein the at least one dimension of the wake wave includes at least one of a wave height, a wave pocket length, or a distance of at least one wave feature from the marine vessel; and wherein the target wake wave geometry range includes at least one of a maximum height limit and a minimum height limit, a maximum length limit and a minimum length limit, and a maximum distance limit and a minimum distance limit.

21. The method of claim 18, further comprising comparing the location of the wakesurf rider to an optimal surf location range and generating the wave pocket alteration action based on the comparison.

22. The method of claim 21, wherein the location of the wakesurf rider includes a relative location compared to at least one of a wave feature or a distance of the wakesurf rider with respect to the marine vessel, and wherein the optimal surf location range includes at least one of a minimum relative location and a maximum relative location or a minimum distance and a maximum distance.

23. The method of claim 18, wherein generating the wave pocket alteration action includes at least one of controlling a marine drive to increase or decrease a speed of the marine vessel or controlling a trimmable device or a fillable ballast to increase or decrease a pitch of the marine vessel.

24. The method of claim 18, wherein generating the wave pocket alteration action includes controlling a user interface to generate a wave pocket alert instructing operation of at least one of a marine drive, a trimmable device, or a fillable ballast to adjust at least one of a speed or a pitch of the marine vessel.

* * * * *